(12) United States Patent
Hsu et al.

(10) Patent No.: US 11,022,707 B2
(45) Date of Patent: *Jun. 1, 2021

(54) METHOD OF DETERMINING EARTHQUAKE EVENT AND RELATED EARTHQUAKE DETECTING SYSTEM

(71) Applicant: National Applied Research Laboratories, Taipei (TW)

(72) Inventors: Ting-Yu Hsu, New Taipei (TW); Rih-Teng Wu, New Taipei (TW); Shyu-Yu Wu, Kaohsiung (TW); Pei-Yang Lin, Taipei (TW); Shieh-Kung Huang, Taoyuan County (TW); Hung-Wei Chiang, Tainan (TW); Kung-Chun Lu, Hsinchu (TW); Kuo-Chun Chang, Taipei (TW)

(73) Assignee: National Applied Research Laboratories, Taipei (TW)

(*) Notice: Subject to any disclaimer, the term of this patent is extended or adjusted under 35 U.S.C. 154(b) by 460 days.

This patent is subject to a terminal disclaimer.

(21) Appl. No.: 14/490,659

(22) Filed: Sep. 18, 2014

(65) Prior Publication Data

US 2015/0331120 A1    Nov. 19, 2015

(30) Foreign Application Priority Data

May 16, 2014  (TW) .................................. 103117363

(51) Int. Cl.
*G01V 1/00* (2006.01)
*G01V 1/28* (2006.01)
(Continued)

(52) U.S. Cl.
CPC .............. *G01V 1/008* (2013.01); *G01V 1/282* (2013.01); *G01V 1/303* (2013.01); *G06N 20/00* (2019.01)

(58) Field of Classification Search
CPC . G01V 1/00; G01V 1/008; G01V 1/28; G01V 1/282; G01V 1/30; G01V 1/303; G06N 99/005; G06N 20/00; G08B 21/10
(Continued)

(56) References Cited

U.S. PATENT DOCUMENTS 5,484,968 A * 1/1996 Nakamura ............. G01V 1/008
                                                         181/122
9,368,017 B2 * 6/2016 Hsu ........................ G08B 21/10
(Continued)

FOREIGN PATENT DOCUMENTS

CA          2405824 A1 * 10/2001   ........... G06K 9/6269
CN        105093285     * 11/2015
(Continued)

OTHER PUBLICATIONS

English Abstract of JP 2010230310, Oct. 2014.*
(Continued)

*Primary Examiner* — Michael P Nghiem
(74) *Attorney, Agent, or Firm* — Winston Hsu (57) ABSTRACT

A method of determining an earthquake event for an earthquake detecting system includes retrieving at least one initial wave characteristic related to each earthquake data among a plurality of earthquake data; utilizing a support vector classification (SVC) method to establish an earthquake determination model according to the initial wave characteristic; and determining whether new earthquake data belong to an earthquake event or a non-earthquake event according to the earthquake determination model when the new earthquake data are received.

12 Claims, 4 Drawing Sheets

(51) Int. Cl.
*G01V 1/30* (2006.01)
*G06N 20/00* (2019.01)

(58) Field of Classification Search
USPC .......................................................... 702/15
See application file for complete search history.

(56) References Cited

U.S. PATENT DOCUMENTS

| | | | |
|---|---|---|---|
| 2013/0163603 | A1 | 6/2013 | Hasesaka |
| 2014/0249756 | A1* | 9/2014 | Hsu .................. G01V 1/008 702/15 |
| 2015/0331121 | A1* | 11/2015 | Huang ................ G01V 1/008 702/15 |
| 2015/0378036 | A1* | 12/2015 | Taya .................. G01V 1/28 702/15 |

FOREIGN PATENT DOCUMENTS

| | | | |
|---|---|---|---|
| JP | 2013142642 | A | 7/2013 |
| JP | 2010230310 | | * 10/2014 |

OTHER PUBLICATIONS

Hsu et al., "A Practical Guide to Support Vector Classification", 2010, National Taiwan University, pp. 1-16.*
Huang et al., "Using Support Vector Regression for Classification", 2008, China University of Geosciences, pp. 581-588.*
Steve Gunn, "Support Vector Machines for Classification and Regression", University of Southhampton, May 1998.*
Wang Wei et al., Support Vector Machines and Its Application Future in Earthquake Prediction, 2006 (Year: 2006).*
"Training, validation, and test sets", Oct. 24, 2019, Wikipedia, pp. 1-6. (Year: 2019).*
English Abstract of CN 105093285 (Year: 2015).*
Wei et al., Research on Integrated Prediction Model of Earthquake Precursors Based on Support Vector Machine Regression in Ningxia, Journal of Seismological Research, vol. 37, No. 2, p. 186-191, Apr. 2014.
Zhang et al., Seismic Safety Evaluation for Nuclear Power Plants, p. 61-63, Published by Shanghai Science and Technology Press, Shanghai, Jan. 31, 2013.
Wang et al., Multi-Core Method for Pattern Analysis and Related Application, p. 8-13, Published by National Defense Industry Press, Beijing, Mar. 31, 2014.
Wang et al., Multi-Core Method for Pattern Analysis and Related Application, p. 8-13, Published by National Defense Industry Press, Beijing, Mar. 2014.
Xiao, Vehicle Recognition and Earthquake Prediction by Using Support Vector Machine, China Master's Theses Full-text Database, Volume of Basic Science, No. 1, 2007, pp. 32-37, 51-56, Dec. 16, 2006.
Ting-Yu Hsu et al., Rapid on-site peak ground acceleration estimation based on support vector regression and P-wave features in Taiwan, Soil Dynamics and Earthquake Engineering, vol. 49, 2013, pp. 210-217, Elsevier.
Tan, Prediction of Earthquake in Yunnan Region Based on the Support Vector Machine, Chinese Master's Theses Full-text Database, Volume of Information Science and Technology, No. 4, 2011, p. 7-9, Mar. 16, 2011.
Wang et al., Support Vector Machines and Its Application Future in Earthquake Predication, Northwestern Seismological Journal, vol. 28 No. 1, Mar. 2006, p. 78-84.
Li et al., Prediction of Southwest China Strong Earthquakes based on Support Vector Machines, Journal of Seismological Research, vol. 30 No. 2, Apr. 2007, p. 133-136.
Li et al., Method of predict the annual earthquake tendency in North China area with Support Vector Machines classification, North China Earthquake Sciences, vol. 25 No. 3, Sep. 2007, p. 11-14.
Kenneth W. Campbell et al., A Ground Motion Prediction Equation for the Horizontal Component of Cumulative Absolute Velocity (CAV) Based on the PEER-NGA Strong Motion Database, Earthquake Spectra, vol. 26, No. 3, pp. 635-650, Aug. 2010, Earthquake Engineering Research Institute.
Classification of the earthquake precursor wave based on wavelet transform and support vector machine, Y. Zhang et al., Journal of Northwest University (Natural Science Edition), vol. 42, No. 6, p. 935-939, Dec. 31, 2012.
An application of support vector machine method to short-term earthquake predication, L. Yang, North China Earthquake Sciences, vol. 28, Issue 3, p. 10-14, Sep. 30, 2010.

* cited by examiner

METHOD OF DETERMINING EARTHQUAKE EVENT AND RELATED EARTHQUAKE DETECTING SYSTEM

BACKGROUND OF THE INVENTION

1. Field of the Invention

The present invention relates to a method of determining an earthquake event and a related earthquake detecting system, and more particularly, to a method of determining whether received earthquake data belong to an earthquake event or a non-earthquake event according to an initial wave characteristic of an earthquake, and a related earthquake detecting system.

2. Description of the Prior Art

Due to advances in seismology, digital communication, automatic processing and algorithms, earthquake early warning (EEW) techniques have emerged in recent years. EEW techniques can be divided into two groups: regional warning and on-site warning. Since the regional warning leverages information of several earthquake stations next to the epicenter, the accuracy of earthquake parameter estimation of a regional warning system is usually higher than an on-site warning system. For regions close to the epicenter, however, the seismic intensity is much higher than in regions outside; hence, the lead time allows the regional warning system to estimate earthquake parameters before the arrival of destructive waves is limited. The on-site warning system can immediately provide earthquake parameter estimation to achieve rapid early warning since only the information at the target site is required, especially for regions close to the epicenter.

Recent studies show that the on-site warning system may be triggered due to vibration signals caused by non-earthquake events, which may result in false alarms at the station. The classification between true earthquake and non-earthquake events thereby becomes an important issue. A conventional approach to solve this problem applies two earthquake sensors installed at different locations as a double check procedure. This method is costly and the earthquake stations are also difficult to be installed and maintained. Thus, a more effective and cost saving method that can enhance the accuracy of the on-site warning system is required.

SUMMARY OF THE INVENTION

It is therefore an objective of the present invention to provide a method of determining an earthquake event and a related earthquake detecting system capable of determining whether received earthquake data belong to an earthquake event or a non-earthquake event via an earthquake determination model established by utilizing a support vector classification (SVC) method according to the initial wave characteristic of earthquakes.

The present invention discloses a method of determining an earthquake event for an earthquake detecting system. The method comprises retrieving at least one initial wave characteristic related to each earthquake data among a plurality of earthquake data; utilizing an SVC method to establish an earthquake determination model according to the initial wave characteristic; and determining whether new earthquake data belong to an earthquake event or a non-earthquake event according to the earthquake determination model when the new earthquake data are received.

The present invention further discloses an earthquake detecting system. The earthquake detecting system comprises an earthquake detecting module, for retrieving at least one initial wave characteristic related to each earthquake data among a plurality of earthquake data; a computation module, for utilizing an SVC method to establish an earthquake determination model according to the initial wave characteristic; and an earthquake determination module, for determining whether new earthquake data belong to an earthquake event or a non-earthquake event according to the earthquake determination model when the earthquake detecting module receives the new earthquake data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
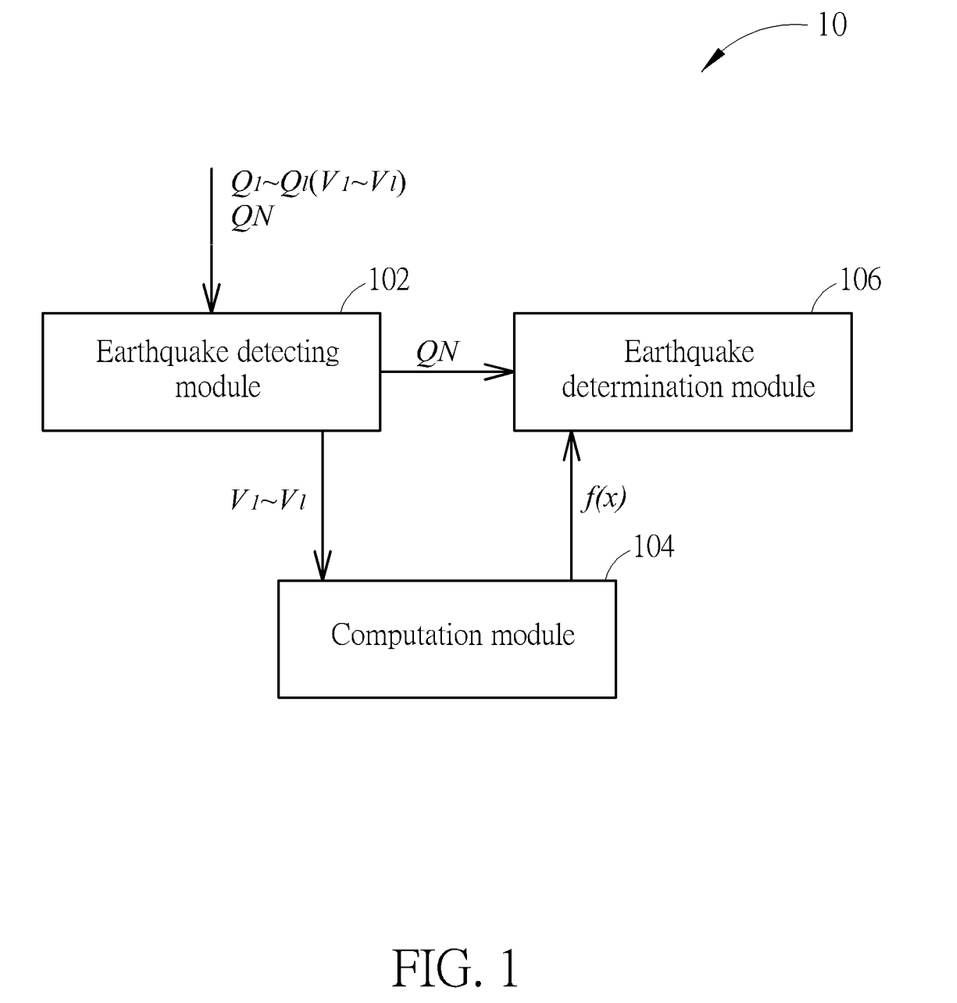
FIG. 1 is a schematic diagram of an earthquake detecting system according to an embodiment of the present invention.

Please refer to FIG. 1, which is a schematic diagram of an earthquake detecting system 10 according to an embodiment of the present invention. The earthquake detecting system 10 includes an earthquake detecting module 102, a computation module 104 and an earthquake determination module 106. The earthquake detecting module 102 is utilized for retrieving at least one of initial wave characteristics $V_1$-$V_I$ related to each earthquake data among a plurality of earthquake data $Q_1$-$Q_J$. The initial wave characteristics $V_1$-$V_I$ may be any physical quantity related to the initial waves, such as speed, acceleration or displacement. The initial wave characteristics $V_1$-$V_I$ can provide an earthquake early warning (EEW) before the primary waves arrive. In an embodiment, the initial wave characteristics $V_1$-$V_I$ include the cumulative absolute velocity (CAV), integral of absolute velocity (IAV) and integral of absolute displacement (IAD) of the ground motion detected within a period of time after the initial waves arrive. The initial wave characteristics $V_1$-$V_I$ may be utilized as a threshold for determining whether an earthquake occurs. For example, an earthquake may occur when the CAV of the ground motion detected by the earthquake detecting system 10 exceeds a threshold value. In an embodiment, for the sake of immediacy of earthquake detection and to save on numbers of ground motion sensors, only the vertical component of the ground motion may be applied. When the initial waves arrive, the measured characteristics of the vertical ground motion are regarded as the initial wave characteristics $V_1$-$V_I$, and these characteristics may include the CAV, IAV and IAD. In another embodiment, ground motion components along other directions may also be adopted as the initial wave characteristics $V_1$-$V_I$. Considering the integrity of the statistic earthquake data, multiple ground motion sensors may also be utilized for simultaneously measuring the ground motion in multiple directions as the initial wave characteristics $V_1$-$V_l$.

The computation module 104 may utilize a support vector classification (SVC) method to establish an earthquake determination model according to the initial wave characteristics $V_1$-$V_l$ obtained by the earthquake detecting module 102. According to this earthquake determination model, the earthquake determination module 106 may determine whether new earthquake data QN belong to an earthquake event or a non-earthquake event when the earthquake detecting module 102 receives the new earthquake data QN. Through the SVC method, the accuracy of the on-site earthquake warning system determining earthquake events may be enhanced, which preserves the immediacy of the on-site earthquake warning system while preventing erroneous determination caused by non-earthquake events.

According to the SVC method, the initial wave characteristic related to the earthquake data $Q_1$-$Q_l$ may correspond to a plurality of vectors $x_1$-$x_l$, wherein each vector $x_i$ may correspond to a target value $y_i$ and $y_i \in \{1,-1\}$. If the earthquake data $Q_i$ corresponding to the vector $x_i$ are caused by an earthquake event, the corresponding target value may be set to $y_i=1$; if the earthquake data $Q_i$ corresponding to the vector $x_i$ are caused by a non-earthquake event, the corresponding target value may be set to $y_i=-1$. The information of whether the earthquake data $Q_1$-$Q_l$ are caused by the earthquake events or non-earthquake events is obtained from statistical results of the historical data. The SVC method retrieves the initial wave characteristic corresponding to the earthquake events or non-earthquake events based on the historical data, and generates the earthquake determination model. When the new earthquake data QN is received, the SVC method can thereby determine whether the initial wave characteristic of the new earthquake data QN is closer to the initial wave characteristic of the earthquake event or that of the non-earthquake event in the historical data according to the earthquake determination model, in order to determine whether the new earthquake data QN are caused by the earthquake event or the non-earthquake event.

According to the SVC method, the vectors $x_1$-$x_l$ may be mapped into a high-dimensional characteristic space H, and classified in the high-dimensional characteristic space H. The computation module 104 may determine whether the new earthquake data QN belong to the earthquake event or the non-earthquake event by defining the earthquake determination model as the following function $f(x)$:

$$f(x) = \text{sgn}\left[\sum_{i,j=1}^{l} y_i \alpha_i K(x_i, x_j) + b\right]$$

wherein K is a kernel function corresponding to the high-dimensional characteristic space H and $K(x_i,x_j)=\phi(x_i)^T\phi(x_j)$, and $\alpha_1$-$\alpha_l$ and b are both coefficients derived from the vectors $x_1$-$x_l$ and the target values $y_1$-$y_l$ corresponding to the earthquake data $Q_1$-$Q_l$ according to the SVC method. In the SVC method, the parameters $\alpha_1$-$\alpha_l$ and b may be obtained by solving the following primal problem:

$$\min_{w,b,\xi}\left[\frac{1}{2}w^T w + C \sum_{i=1}^{l} \xi_i\right]$$

subjected to $$y_i(w^T\phi(x_i)+b) \geq 1-\xi_i, \xi_i \geq 0, i=1,\ldots,l$$

wherein w is a vector in the high-dimensional characteristic space H, $\xi_1$-$\xi_l$ and b are variables of the primal problem, and $\phi$ is a function mapping the vectors $x_1$-$x_l$ to the high-dimensional characteristic space H. The primal problem has a dual form as follows:

$$\min_{\alpha}\left[\frac{1}{2}\alpha^T Q \alpha - e^T \alpha\right]$$

subjected to $$y^T\alpha=0, 0 \leq \alpha_i \leq C, i=1,\ldots,l$$

wherein e is a unit vector, C>0 and is an upper limit of $\alpha_i$, Q is an l×l positive semi-definite matrix, and $Q_{ij} \equiv y_i y_j K(x_i, x_j)$. According to the above equations, the vector corresponding to the initial wave characteristic of the inputted new earthquake data QN may be calculated, and two types of results $f(x)=1$ or $f(x)=-1$ may be obtained. When $f(x)=1$, the new earthquake data QN may belong to an earthquake event; when $f(x)=-1$, the new earthquake data QN may belong to a non-earthquake event.

In other words, based on the initial wave characteristics related to the earthquake data $Q_1$-$Q_l$ in the historical data, the computation module 104 may calculate the parameters $\alpha_1$-$\alpha_l$ and b via the above equations according to the SVC method, in order to establish the earthquake determination model $f(x)$. When the earthquake detecting module 102 detects a new earthquake data QN, the initial wave characteristic of the new earthquake data QN may be converted into a specific vector, and the earthquake determination module 106 may calculate that $f(x)=1$ or $-1$ according to this specific vector and the earthquake determination model $f(x)$, in order to determine whether the new earthquake data QN is caused by an earthquake event or a non-earthquake event. This prevents ground motions generated by a non-earthquake event from being erroneously attributed to an earthquake.

In the earthquake detecting system 10, the earthquake detecting module 102, the computation module 104 and the earthquake determination module 106 may be located in different locations and may communicate with each other via a wired network or a wireless network. For example, the earthquake detecting module 102 may not be limited to a single earthquake station or earthquake detector; it may also include a plurality of earthquake stations or earthquake detectors located in different locations. The earthquake stations or earthquake detectors of the earthquake detecting module 102 may be installed in the regions where earthquakes frequently occur, so that new earthquake data QN can be rapidly detected. The computation module 104 may be located in the earthquake information center for obtaining the massive earthquake data $Q_1$-$Q_l$, in order to improve the accuracy of the earthquake determination model $f(x)$. The earthquake determination module 106 may be located in the warning center, so that an earthquake warning can be delivered immediately when determining that the new earthquake data QN belong to an earthquake event.

The above equations related to the SVC method are only one embodiment of the present invention, and should not be taken as limiting the scope of the present invention. Those skilled in the art may use other mathematical equations along with the SVC method to obtain equations capable of determining whether new earthquake data belong to an earthquake event.

As a further illustration of the effects of the above embodiments, the accuracy of the earthquake data and non-earthquake data determined by the earthquake determination model $f(x)$ may be obtained via simulations. The earthquake data $Q_1$-$Q_I$ utilized by the computation module 104 for training the earthquake determination model $f(x)$ should include both earthquake data belonging to earthquake events and earthquake data belonging to non-earthquake events. Those earthquake data belonging to earthquake events may be data of actual earthquakes obtained from historical records of, for example, the Taiwan Central Weather Bureau, or may be data obtained from an earthquake early warning system (EEWS) where the data is known for an occurring earthquake. Those earthquake data belonging to non-earthquake events may be analogous earthquake data or non-earthquake data obtained from the EEWS, or may be data obtained from EEWS where the data is not regarded as an earthquake event by the Taiwan Central Weather Bureau. Please note that, in Taiwan, the Taiwan Central Weather Bureau has a complete arrangement of earthquake stations and earthquake detecting systems, and can thereby obtain high accuracy earthquake data. Earthquake data recorded by the Taiwan Central Weather Bureau may be considered to correspond to actual earthquake events.

In an illustration of the earthquake determination method, the earthquake detecting system 10 utilizes the vertical component of the acceleration of the earthquake data $Q_1$-$Q_I$ within the first 3 seconds immediately after the corresponding initial wave arrives, and then integrates the data to generate speed and displacement information. These physical quantities may be regarded as the initial wave characteristics utilized for establishing the earthquake determination model $f(x)$. The earthquake detecting system 10 then obtains 91,142 records from earthquake data of the Taiwan Central Weather Bureau from Jul. 29, 1992 to Dec. 31, 2006, and collects several earthquake data from earthquake stations which have been verified to belong to both earthquake and non-earthquake events, including 54 and 6,743 records, respectively. There are a total of 91,196 records of data belonging to earthquake events and 6,743 records of data belonging to non-earthquake events to be verified by simulations of the earthquake determination model $f(x)$ established in the above embodiments.

Figure 2:
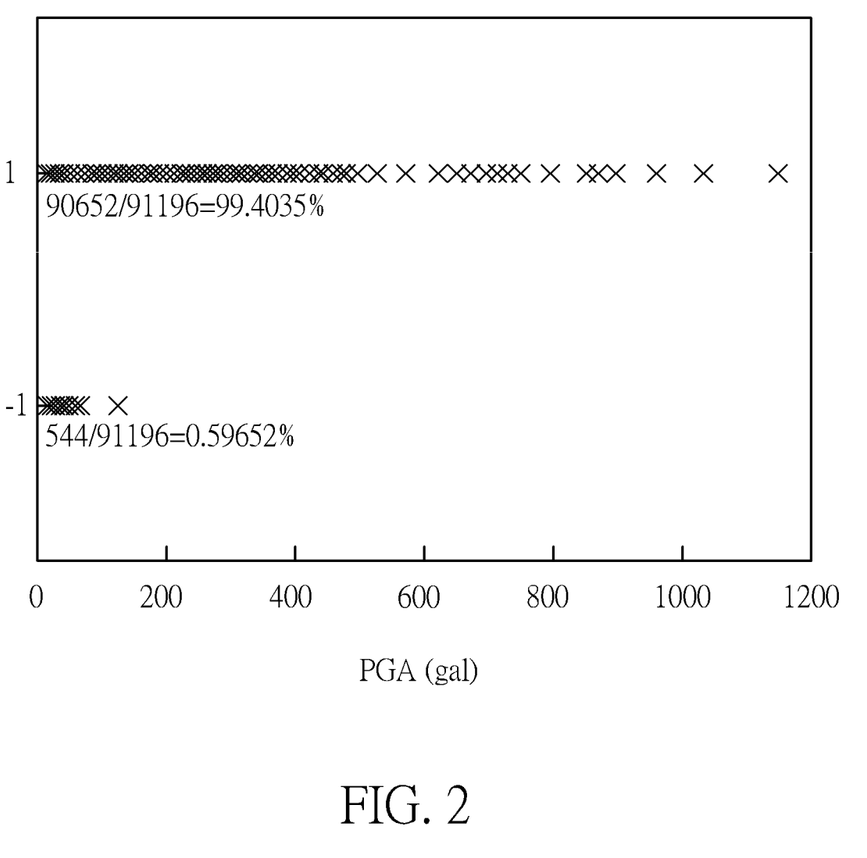
FIG. 2 is a schematic diagram of earthquake data belonging to earthquake events determined via an earthquake determination model according to an embodiment of the present invention.

Please refer to FIG. 2, which is a schematic diagram of earthquake data belonging to earthquake events determined via the earthquake determination model $f(x)$ according to an embodiment of the present invention. In order to obtain determination results of earthquakes having different intensities, this embodiment also includes the peak ground acceleration (PGA) related to the intensities of earthquakes for analysis. As shown in FIG. 2, according to the determination of the earthquake determination module 106, when the earthquake determination model $f(x)$ outputs $f(x)=1$, the earthquake data is determined to be an earthquake event; when the earthquake determination model $f(x)$ outputs $f(x)=-1$, the earthquake data is determined to be a non-earthquake event. Among the above 91,196 records of earthquake data belonging to earthquake events, there are 90,652 records (99.4035%) accurately determined to be earthquake events, and 544 records (0.59652%) erroneously determined to be non-earthquake events. The earthquake determination model $f(x)$ of the present invention can achieve a high accuracy rate of 99.4% for those earthquake data belonging to earthquake events. In addition, all earthquake data having a PGA greater than 200 gal can accurately be determined to be earthquake events via the earthquake determination model $f(x)$ of the present invention.

Figure 3:
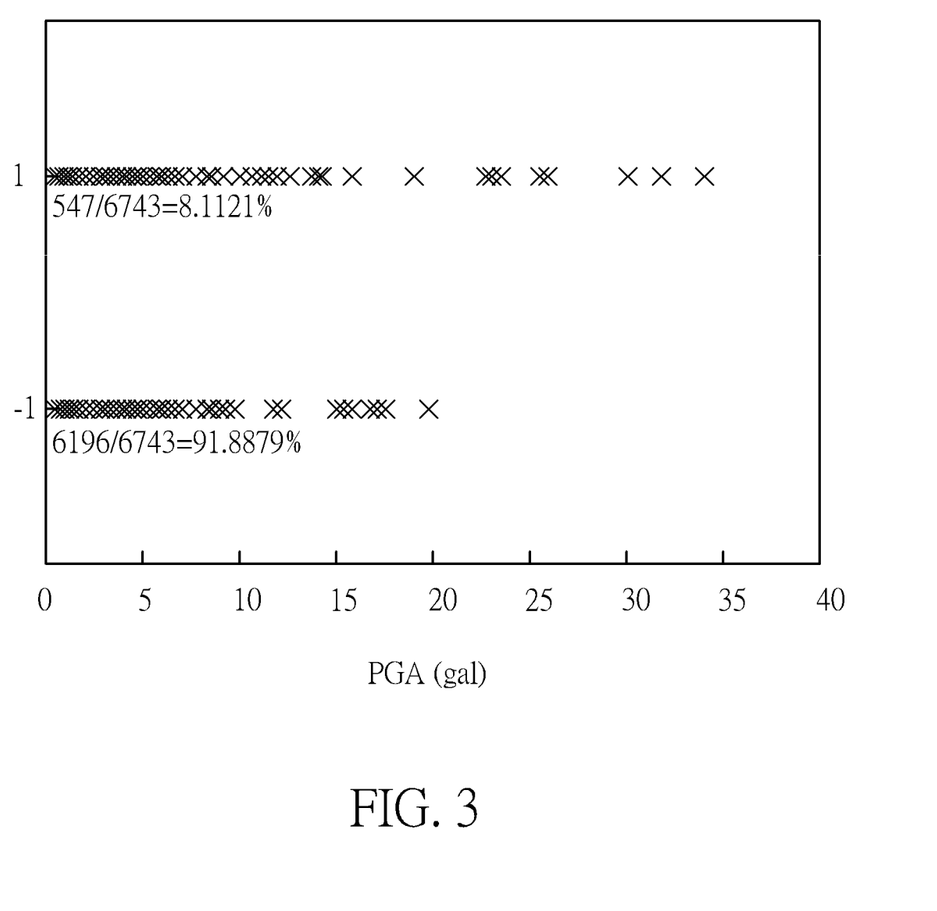
FIG. 3 is a schematic diagram of earthquake data belonging to non-earthquake events determined via the earthquake determination model according to an embodiment of the present invention.

Please refer to FIG. 3, which is a schematic diagram of earthquake data belonging to non-earthquake events determined via the earthquake determination model $f(x)$ according to an embodiment of the present invention. Similarly, this embodiment also includes the PGA data for analysis. As shown in FIG. 3, according to the determination of the earthquake determination module 106, when the earthquake determination model $f(x)$ outputs $f(x)=1$, the earthquake data is determined to be an earthquake event; when the earthquake determination model $f(x)$ outputs $f(x)=-1$, the earthquake data is determined to be a non-earthquake event. Among the above 6,743 records of earthquake data belonging to non-earthquake events, there are 6,196 records (91.8879%) accurately determined to be non-earthquake events, and 547 records (8.1121%) erroneously determined to be earthquake events. The earthquake determination model $f(x)$ of the present invention can achieve an accuracy rate of 91.89% for those earthquake data belonging to non-earthquake events. In other words, for those 6,743 records of earthquake data measured by the earthquake stations in response to non-earthquake events, the earthquake determination model $f(x)$ of the present invention can accurately determine that 91.89% of those earthquake data belong to non-earthquake events, and thereby prevent false alarms.

As shown in the above determination results, even if only the vertical component of the acceleration within the first 3 seconds immediately after the initial wave arrives is utilized, the earthquake determination model $f(x)$ of the present invention can still achieve high accuracy. Since only the vertical ground motion parameters are required, the earthquake detecting module 102 may use fewer numbers of ground motion sensors, which reduces the cost involved for the earthquake stations. The vectors converted from the new earthquake information may still be utilized for training the earthquake determination model $f(x)$, to thereby enhance the accuracy of the earthquake determination model $f(x)$.

Figure 4:
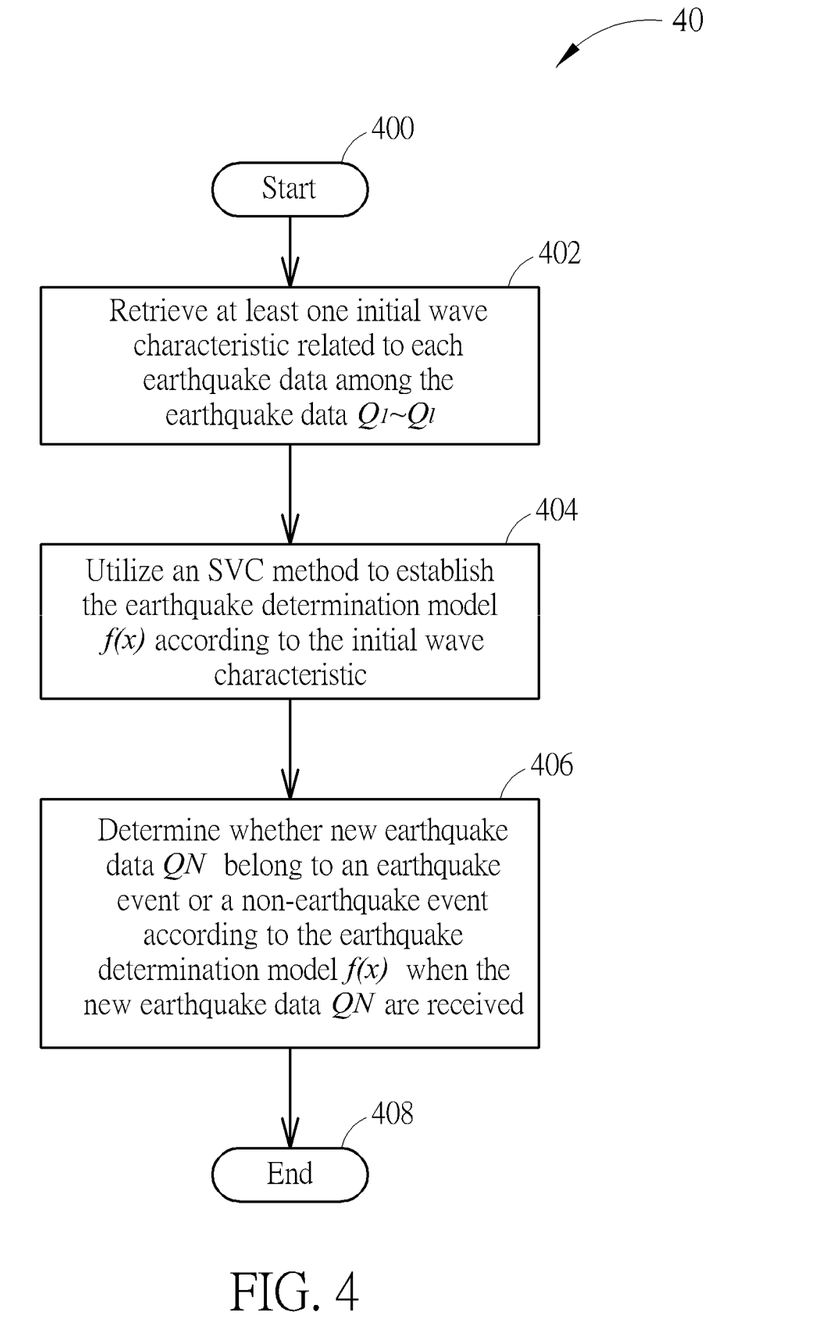
FIG. 4 is a schematic diagram of an earthquake determination process according to an embodiment of the present invention.

The abovementioned operations related to the earthquake detecting system 10 can further be summarized into an earthquake determination process 40, as shown in FIG. 4. The earthquake determination process 40 includes the following steps:

Step 400: Start.

Step 402: Retrieve at least one initial wave characteristic related to each earthquake data among the earthquake data $Q_1$-$Q_I$.

Step 404: Utilize an SVC method to establish the earthquake determination model $f(x)$ according to the initial wave characteristic.

Step 406: Determine whether new earthquake data QN belong to an earthquake event or a non-earthquake event according to the earthquake determination model $f(x)$ when the new earthquake data QN are received.

Step 408: End.

Detailed operations and variations of the earthquake determination process 40 are illustrated above, and will not be repeated herein.

In the prior art, an on-site warning system may be triggered by vibration signals caused by non-earthquake events, which may result in false alarms at the station. If two earthquake sensors are installed at different locations as a double check procedure, both the cost and difficulty in installing and maintaining the earthquake stations may increase. In comparison, the earthquake determination method and earthquake detecting system of the present invention utilize the earthquake determination model established according to the SVC method to determine whether received new earthquake data belong to an earthquake event or a non-earthquake event. According to the simulation results of historical data where only the vertical component of the ground motion parameters of the initial waves is utilized, the determination for the earthquake data belonging to earthquake events achieves an accuracy rate of 99.4%, and the determination for the earthquake data belonging to non-earthquake events achieves an accuracy rate of 91.89%. The present invention therefore not only provides a higher accuracy earthquake determination, but also achieves the benefit of low cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining an earthquake event for an earthquake detecting system, the method comprising:

retrieving at least one initial wave characteristic related to each earthquake data among a plurality of earthquake data;

utilizing a support vector classification (SVC) method to establish an earthquake determination model and enhancing an accuracy of the earthquake determination model according to a plurality of vectors corresponding to the initial wave characteristic of the plurality of earthquake data;

determining to classify each of new earthquake data into one of an earthquake event and a non-earthquake event according to the earthquake determination model when the new earthquake data are received;

wherein, each of the plurality of vectors corresponds to one of the plurality of earthquake data and a target value, wherein the target value is based on whether the corresponding earthquake data is classified into the earthquake event or the non-earthquake event;

wherein the earthquake determination model is represented as a function $f(x)$, and the function $f(x)$ equals:

$$f(x) = \text{sgn}\left[\sum_{i,j=1}^{l} y_i \alpha_i K(x_i, x_j) + b\right]$$

wherein x1-xl are the plurality of vectors and y1-yl are the target value corresponding to each of the plurality of vectors x1-xl, respectively, wherein $y_i \in (1,-1)$, and K is a kernel function corresponding to a high-dimensional characteristic space;

wherein α1-αl and b are obtained by solving a primal problem O (w, b, ξ), and the primal problem O (w, b, ξ) is:

$$O(w, b, \xi) = \min_{w,b,\xi}\left[\frac{1}{2}w^T w + C\sum_{i=1}^{l} \xi_i\right]$$

subjected to $$y_i(w^T\phi(x_i)+b)\geq 1-\xi_i, \xi_i\geq 0, i=1,\ldots,l$$

wherein w is a vector in the high-dimensional characteristic space, ξ1-ξl and b are variables of the primal problem, and ϕ is a function mapping the plurality of vectors x1-xl to the high-dimensional characteristic space; and wherein the step of utilizing the SVC method to establish the earthquake determination model and enhancing the accuracy of the earthquake determination model according to the plurality of vectors corresponding to the initial wave characteristic of the plurality of earthquake data comprises:

calculating the coefficients $a_1$-$a_l$ and b of the function $f(x)$ based on the plurality of vectors x1-xl by solving the primal problem;

converting the new earthquake data into a new vector which is substituted in the function $f(x)$; and obtaining an output value of the function $f(x)$ with the substitution of the new vector, and the output value indicates that the earthquake data is classified into the earthquake event or the non-earthquake event; and delivering an earthquake warning to a geological region when the output value indicates the earthquake event.

2. The method of claim 1, wherein the initial wave characteristic comprises a vertical component of a ground motion detected when an initial wave arrives.

3. The method of claim 2, wherein the initial wave characteristic comprises a cumulative absolute velocity (CAV), an integral of absolute velocity (IAV) and an integral of absolute displacement (IAD) of the ground motion.

4. The method of claim 1, wherein the function outputs 1 when the earthquake data is classified into the earthquake event and outputs −1 when the earthquake data is classified into the non-earthquake event.

5. The method of claim 1, wherein the primal problem is converted into a dual form O(α), and the dual from O(α) is:

$$O(\alpha) = \min_{\alpha}\left[\frac{1}{2}\alpha^T Q\alpha - e^T\alpha\right]$$

subjected to $$y^T\alpha=0, 0\leq\alpha_i\leq C, i=1,\ldots,l$$

wherein e is a unit vector, C>0 and is an upper limit of $\alpha_i$, Q is an l×l positive semi-definite matrix and $Q_{ij}\equiv y_i y_j K(x_i,x_j)$.

6. The method of claim 5, wherein the kernel function is denoted by $K(x_i,x_j)\equiv\phi(x_i)^T\phi(x_j)$.

7. An earthquake detecting system, comprising:

an earthquake detector, for retrieving at least one initial wave characteristic related to each earthquake data among a plurality of earthquake data;

a computer, for utilizing a support vector classification (SVC) method to establish an earthquake determination model and enhancing an accuracy of the earthquake determination model according to the plurality of vectors corresponding to the initial wave characteristic of the plurality of earthquake data; and an earthquake estimator, for determining to classify each of new earthquake data into one of an earthquake event and a non-earthquake event according to the earthquake determination model when the earthquake detector receives the plurality of earthquake data;

wherein each of the plurality of vectors corresponds to one of the plurality of earthquake data and a target value, wherein the target value is based on whether the corresponding earthquake data is classified into the earthquake event or the non-earthquake event;

wherein the earthquake estimator determines to classify each earthquake data into one of the earthquake event and the non-earthquake event according to the earthquake determination model represented as a function $f(x)$, and the function $f(x)$ equals:

$$f(x) = \text{sgn}\left[\sum_{i,j=1}^{l} y_i \alpha_i K(x_i, x_j) + b\right]$$

wherein x1-xl are the plurality of vectors and y1-yl are the target value corresponding to each of the plurality of vectors x1-xl, respectively, wherein $y_i \in (1,-1)$, and K is a kernel function corresponding to a high-dimensional characteristic space;

wherein α1-αl and b are obtained by solving a primal problem O (w, b, ξ), and the primal problem O (w, b, ξ) is;

$$O(w, b, \xi) = \min_{w,b,\xi}\left[\frac{1}{2}w^T w + C\sum_{i=1}^{l} \xi_i\right]$$

subjected to $$y_i(w^T\phi(x_i)+b) \geq 1-\xi_i, \xi_i \geq 0, i=1,\ldots,l$$

wherein w is a vector in the high-dimensional characteristic space, ξ1-ξl and b are variables of the primal problem, and φ is a function mapping the plurality of vectors x1-xl to the high-dimensional characteristic space; and wherein the computer performs the following steps to utilize the SVC method to establish the earthquake determination model and enhance the accuracy of the earthquake determination model according to the plurality of vectors corresponding to the initial wave characteristic of the plurality of earthquake data:

calculating the coefficients a1-al and b of the function $f(x)$ based on the plurality of vectors x1-xl by solving the primal problem;

converting the earthquake data into a new vector which is substituted as one of the parameters xt and Xj in the function $f(x)$; and obtaining an output value of the function $f(x)$ with the substitution of the new vector, and the output value indicates that the earthquake data is classified into the earthquake event or the non-earthquake event; and the earthquake detecting system delivers an earthquake warning to a geological region when the output value indicates the earthquake event.

8. The earthquake detecting system of claim 7, wherein the initial wave characteristic comprises a vertical component of a ground motion detected by the earthquake detector when an initial wave arrives.

9. The earthquake detecting system of claim 8, wherein the initial wave characteristic comprises a cumulative absolute velocity (CAV), an integral of absolute velocity (IAV) and an integral of absolute displacement (IAD) of the ground motion.

10. The earthquake detecting system of claim 7, wherein the function outputs 1 when the earthquake data is classified into the earthquake event and outputs −1 when the earthquake data is classified into the non-earthquake event.

11. The earthquake detecting system of claim 7, wherein the primal problem is converted into a dual form O(α), and the dual form O(α) is:

$$O(\alpha) = \min_{\alpha}\left[\frac{1}{2}\alpha^T Q\alpha - e^T\alpha\right]$$

subjected to $$y^T\alpha=0, 0\leq \alpha_i \leq C, i=1,\ldots,l$$

wherein e is a unit vector, C>0 and is an upper limit of $\alpha_i$, Q is an l×l positive semi-definite matrix and $Q_{ij} \equiv y_i y_j K(x_i, x_j)$.

12. The earthquake detecting system of claim 11, wherein the kernel function is denoted by $K(x_i, x_j) \equiv \phi(x_i)^T\phi(x_j)$.

* * * * *